(12) United States Patent
Kroner et al.

(10) Patent No.: US 10,901,387 B2
(45) Date of Patent: Jan. 26, 2021

(54) CONTROL SYSTEM FOR AN INDUSTRIAL AUTOMATION FACILITY AND METHOD FOR PROGRAMMING AND OPERATING SUCH A CONTROL SYSTEM

(71) Applicant: Weidmüller Interface GmbH & Co. KG, Detmold (DE)

(72) Inventors: Michael Kroner, Oerlinghausen (DE); Immo Birnbaum, Paderborn (DE); Sebastian Brinkmann, Paderborn (DE); Michael Brockmeyer, Detmold (DE); Felix Harring, Detmold (DE); Stefan Herbrechtsmeier, Steinhagen (DE); Christian Peters, Oerlinghausen (DE)

(73) Assignee: Weidmüller Interface GmbH & Co. KG

( * ) Notice: Subject to any disclaimer, the term of this patent is extended or adjusted under 35 U.S.C. 154(b) by 0 days.

(21) Appl. No.: 16/461,432

(22) PCT Filed: Nov. 21, 2017

(86) PCT No.: PCT/EP2017/079932
§ 371 (c)(1),
(2) Date: May 16, 2019

(87) PCT Pub. No.: WO2018/091741
PCT Pub. Date: May 24, 2018

(65) Prior Publication Data
US 2019/0346819 A1 Nov. 14, 2019

(30) Foreign Application Priority Data
Nov. 21, 2016 (DE) .......................... 10 2016 122 324

(51) Int. Cl.
*G05B 19/04* (2006.01)
*G06F 8/34* (2018.01)
(Continued)

(52) U.S. Cl.
CPC ......... *G05B 19/0426* (2013.01); *G05B 19/05* (2013.01); *G06F 8/315* (2013.01); *G06F 8/34* (2013.01); *G06F 9/451* (2018.02)

(58) Field of Classification Search
None
See application file for complete search history.

(56) References Cited

U.S. PATENT DOCUMENTS

| | | | | |
|---|---|---|---|---|
| 5,950,006 A | * | 9/1999 | Crater | ................ G05B 19/0426 717/127 |
| 2007/0005158 A1 | * | 1/2007 | Nicolson | ............ G05B 19/4141 700/69 |

(Continued)

OTHER PUBLICATIONS

Igarashi Keiko et al: "Symbols and Rules for a Self-Explanatory Machine Model", 2014 IEEE 8th International Symposium on Embedded Multicore/Manycore Socs, IEEE, Sep. 23, 2014 (Sep. 23, 2014), pp. 49-54, XP032678371, DOI: 10.1109/MCSOC.2014. 16.

(Continued)

*Primary Examiner* — Philip Wang
(74) *Attorney, Agent, or Firm* — Laubscher & Laubscher, P.C.

(57) ABSTRACT

A control system for an industrial automation facility and a method for programming and operating the control system use a program for the control system which is developed with a development tool. Data from a web server built into the control system is transmitted to a computer which is connected to the control system via a network. The data includes a web-based development environment. A representation of the development environment in a web browser (Continued)

is embodied on the computer. A program for the control system is developed or processed by a user. The program developed and/or processed by the user is converted into a high-level language program by a conversion module embodied in the web browser. The high-level language program is transmitted to the control system and converted into a binary program inside the control system. The binary program is implemented by the control system.

15 Claims, 4 Drawing Sheets

(51) Int. Cl.
*G05B 19/042* (2006.01)
*G06F 9/451* (2018.01)
*G05B 19/05* (2006.01)
*G06F 8/30* (2018.01)

(56) References Cited

U.S. PATENT DOCUMENTS

| | | | |
|---|---|---|---|
| 2008/0072211 A1* | 3/2008 | Rothman | G06F 9/44573 717/122 |
| 2011/0072170 A1* | 3/2011 | Flachs | G06F 9/3001 710/22 |
| 2014/0094934 A1* | 4/2014 | Blair | G03B 21/208 700/12 |
| 2015/0186119 A1* | 7/2015 | Chouinard | G06F 8/34 717/113 |
| 2017/0060726 A1* | 3/2017 | Glistvain | G06F 8/38 |

OTHER PUBLICATIONS

Hausladen Jurgen et al: "A cloud-based integrated development environment for embedded systems", 2014 IEEE/ASME 10th International Conference on Mechatronic and Embedded Systems and Applications (MESA), IEEE, Sep. 10, 2014 (Sep. 10, 2014), pp. 1-5, XP032669618, DOI: 10.1109/MESA.2014.6935577.

* cited by examiner

CONTROL SYSTEM FOR AN INDUSTRIAL AUTOMATION FACILITY AND METHOD FOR PROGRAMMING AND OPERATING SUCH A CONTROL SYSTEM

CROSS-REFERENCE TO RELATED APPLICATIONS

This application is a § 371 National Stage Entry of International Patent Application No. PCT/EP2017/079932 filed Nov. 21, 2017. Application No. PCT/EP2017/079932 claims priority of DE102016122324.7 filed Nov. 21, 2016. The entire content of these applications are incorporated herein by reference.

BACKGROUND OF THE INVENTION

The invention relates to a method for programming and operating a control system of an industrial automation facility, which a program for the control system is developed with a development tool.

The invention further relates to a control system suitable for performing the method.

Industrial automation facilities provide process control and monitoring of automated industrial facilities. Typically, they have an industrial automation control system, also referred to as a programmable logic controller (PLC) and hereinafter referred to in short as a control system. The control system is directly coupled to field instruments via a field bus or via a field bus coupler, also referred to as a field bus gateway. Field instruments are, for example, input and/or output modules, also referred to in short as I/O modules, which provide analog and/or digital input and/or output channels, which can be used to control facility components and to read measured values, for example, from sensors.

For programming the control system, an external development environment such as an engineering tool is typically used. According to the standard IEC 61131, the underlying program can be entered in various forms. A frequently used form is one or more function modules, similar to logic modules. These function modules can be positioned in a graphic user interface and linked to each other. Alternatively, text-based programming is also possible.

In the development environment, the program developed by the user is converted into an executable program code by a converter, which is transmitted to the control system where it is implemented. In addition the development environment typically provides a mechanism for version control, i. e. older program versions can be stored in a database, also referred to as a repository, so that they can be accessed, if necessary.

Such a development environment has the disadvantage that a computer equipped with this development environment, e. g. a PC, which is coupled to the control system, must be available for programming the control system. In addition, if several developers access the control system from different PCs with such a development environment, a consistent version history is no longer ensured.

SUMMARY OF THE INVENTION

It is the object of the invention to describe a method that can be used for the programming of a control system independently of external computers equipped with a development environment. Another objective is to provide a control system suitable for performing the method.

A method according to the invention includes a control system which transmits a web-based development environment to a computer connected to the control system via a network using a built-in web server. A program developed and/or processed by the user is converted into a high-level language program by a conversion module included in the delivered web site which is transmitted to the control system via the network. In the control system, the high-level language program received is converted into a binary program suitable for implementation on the control system, which then is implemented by the control system.

As a result of the development environment being transmitted to a connected computer by the web server included in the control system, it is not necessary to use computers with a special development environment for programming. Instead, any computer (PC, tablet, etc.) having a web browser can be used for programming. This universality is additionally supported by the fact that, in the web browser, instead of a binary program, which can be directly implemented by the control system, a high-level language program, for example, in C or C++, is developed, which is universal in that it contains no hardware-specific elements of the control system. Such hardware-specific elements can be added in a subsequent conversion process of the high-level language program into the implementable language.

In a preferred embodiment of the method, the program is developed and/or edited in a graphic programming language. For example, the graphic programming language can include function blocks, which allow intuitive programming of the control system. Alternatively, other suitable programming languages can be used for developing the program.

In a further embodiment, in addition to the high-level language program, the program developed or edited by the user is also transferred, to the control system by the computer or the web browser. In this case, the program and/or the high-level program and/or the binary program are stored together in a version storage within the control system. At least the program and the binary program should be stored and assigned to each other. The version storage, which can be configured in the form of a database, does not only make the currently implemented program version available, but also enables storing of previous development states. Every computer accessing the web server of the control system can thus access the currently implemented program as well as previous program versions, if required.

The assignment of binary program and program understandable at any time prevents unwanted splitting of a program into different development branches as a result of older development states of the program being unintentionally further developed where more recent development states already exist. In the further embodiment, the complete version history is available for every web browser, irrespective of the accessing computer.

In another embodiment of the method, in an assembly with at least two control systems, it is possible to process programs for both control systems in a superordinate project from one computer and/or one web browser. In this way, it is possible to work flexibly with distributed projects, where individual control systems realize different sub-projects in a shared superordinate project. As a result of development states being stored in the version storage of each control system, a data consistency for the programs is ensured at any time, even during such distributed tasks. This even applies to a flexible mixed use, where sub-projects are changed separately in individual control systems and within the scope of a superordinate project, if applicable.

To be able to process the superordinate project, if one of the control systems is not available to the web browser of the superordinate processor, it is possible to store a mirror image of the version storage of the individual control system in the computer of the superordinate processor. After reconnection to the control system, the version storages of the control system and the computer and the superordinate processor are synchronized, preferably in an automated manner.

In a preferred embodiment of the method, a database is used to store the version history of the programs. Preferably, a database type is used for which suitable techniques for mirroring and consistency preservation are available to revert to. A control system according to the invention has a web server, which is adapted to deliver a development environment to a connected computer.

In another embodiment of the control system, the control system has a real-time system for executing a binary program for the performance of control tasks and a non-real time system for the provision of the web server. The technically more complex real-time system to be realized is thus reserved for the control tasks, whereas additional tasks of the control system, e. g. in conjunction with the provision of the web server can be executed in the less complex non-real time system.

In one embodiment of the control system, an effective and secure separation between the real-time system and the non-real time system can be implemented by different processors being assigned to the real-time system and the non-real time system. An advantageous alternative includes a processor for the control system having at least two cores, with at least one core being assigned to the real-time system and at least one core to the non-real time system.

Each core can exclusively dispose of at least one first and, if applicable, also a second faster intermediate storage, also referred to as level 1 and level 2 cache, respectively. In another advantageous embodiment, the control system has a memory, one part of which is exclusively assigned to the real time system and a second part to the non-real time system, whereas a third part of the memory can be accessed by both the real-time and the non-real time system. In this way, the exclusively assigned first and second part provide a separation of the two systems, whereas the third, jointly used part allows for a data exchange between the systems, for example, for transmitting the binary program to the real time system, after development in the non-real time system.

In another embodiment of the control system, interfaces, in particular external interfaces and primarily network interfaces, for the real-time system and the non-real time system are implemented separately from each other with respect to the hardware used.

BRIEF DESCRIPTION OF THE FIGURES

The invention is described in the following description with reference to the accompanying drawings, in which.

DETAILED DESCRIPTION

Figure 1:
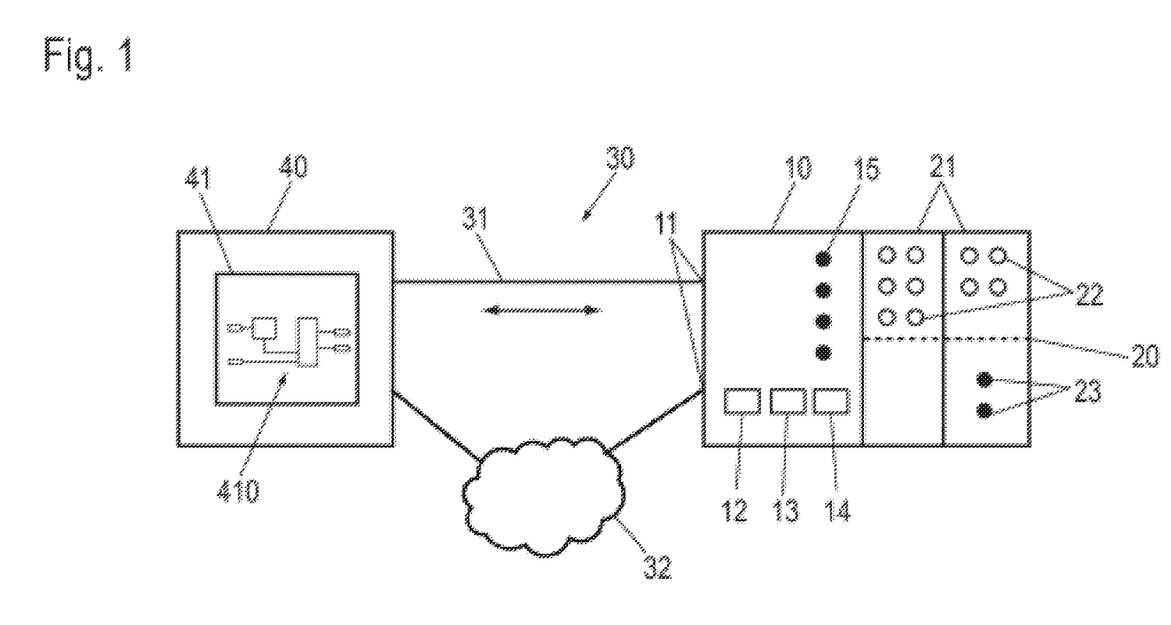
FIG. 1 is a schematic diagram of a control system of an industrial automation facility with a coupled computer, on which a development environment for programming the control system is executed.

FIG. 1 shows an exemplary industrial automation facility with a control system 10 in the form of a block diagram. As an example, two I/O modules 21 having inputs 22 and outputs 23 coupled to components and/or sensors of the industrial facility are connected to the control system 10 via a bus system 20, which can be a field bus system or a proprietary bus. The control system 10 has at least one network connection 11 as well as other connections, e. g. a field bus connection 12, another field bus connection 13, and a USB (Universal Serial Bus) connection 14 as well as control displays 15.

For programming, the control system 10 is connected to a computer 40 via the network connection 11 and a network 30. The computer 40 is only used for programming the control system 10. For control operation, the control system 10 is independent of the computer 40 and can be operated autonomously without the computer.

As an example, two connections between the control system 10 and the computer 40 via the network 30 are shown, one direct connection via a network cable 31 and one connection via an Internet 32. For the connection via the Internet 32, known connection types can be used through which internet-specific protocols can be exchanged.

A web browser 41 is embodied in the computer 40, which implements a website provided by the control system 10, which includes a development environment. The development environment is symbolized in the web browser 41 by a program 410 in the form of a function block diagram representing a graphic programming method for the control system 10 valid according to standard IEC 61131.

Figure 2:
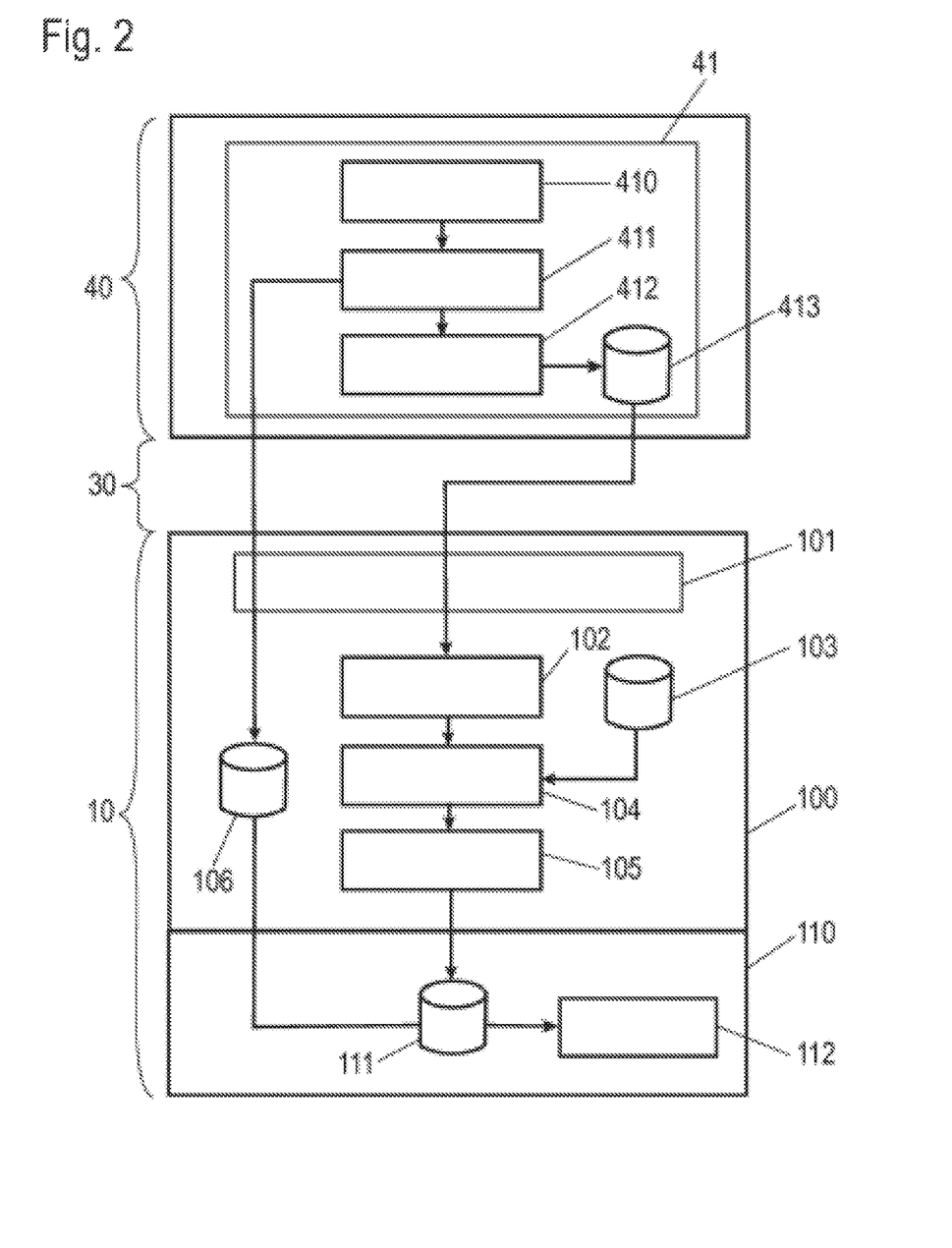
FIG. 2 is a schematic diagram of a method according to the invention.

FIG. 2 shows the interaction of the control system 10 and the computer 40 for programming the control system 10 in more detail in a block diagram. For reasons of clarity, the bus system 20 connected to the control system 10 is not depicted in FIG. 2.

The control system 10 is divided into two sections, of which a first one represents a non-real time system 100 and a second one a real-time system 110. In the real-time system 110, the control tasks are performed. The real-time system 110 includes a storage area, in which an executable binary program 111 is stored as well as the entire process control 112. This functionality is generally known to those of ordinary skill in the art.

A web server 101 is disposed in the non-real time system 100, which outputs and receives data via the network 30.

As explained above in connection with FIG. 1, the computer 40 includes a web bowser 41, which communicates with the web server 101 of the control system 10. Upon connection of the computer 40 with the control system 10 and when calling the web browser 41, web sites are transmitted from the web server 101 to the web browser 41 providing a development system in the web browser 41.

A graphic input facility or editor for a program 410, e. g. in the form of a function block diagram, is included in the development system. The user of the web browser 41 allows the program to be implemented on the control system 10 by compiling and connecting function blocks.

This program 410 is converted into a high-level language program 413 by a high-level language converter 412 also included in the development environment. This high-level language program 413 is stored in a storage area of the computer 40 that can be accessed by the web browser 41. Preferably, the high-level language program 413 is a C program or a C++ program, but other known programming languages can also be used. The advantage of the conversion into a high-level language program 413 is the independence of the control system 10 from hardware.

In addition, a version management 411 is implemented in the development environment, which captures certain version states of the program 410, which are converted into the high-level language program 413, and forwards them to the control system 10. The version states are stored in a version storage 106 provided in the non-real time system 100 in the control system 10. In this way, it is possible to access different version states of the program 410 independently of the computer 40 used.

The high-level language program 413 is then transmitted to the web server 101 of the control system 10 by the computer 40 via the network 30. Preferably, known web-based synchronization mechanisms for data bases are used for this purpose.

In the control system 10, the high-level language program 413 is forwarded to a high-level language converter or compiler 102, which converts the high-level language program 413 into an executable program. A link 104 adds hardware-specific libraries 103 to this program in a subsequent link process. The resulting program is delivered to the real-time system 110 as a binary program 111 in the step of an installation 105 or deployment and is thus available for implementation on the control system 10 by the process control 112.

If this program is to be further developed, it can be modified or further developed independently of the computer 40, with which it was originally developed. Any computer 40 that is locally or globally coupled to the control system 10 via the network 30 is capable of obtaining the development environment from the control system 10 via its web browser 41 and also to load the current or an older version of the program 410 to develop it further. After the program 410 has been changed, it is then transmitted to the control system 10 in the previously described manner by the computer 40 being used, where it is converted into a binary program 111 and implemented.

Preferably, security mechanisms are provided, which prevent unauthorized access to the control system 10. In addition to access restrictions relating to the network 30, the transition from the non-real time system 100 to the real-time system 110 represents a controllable boundary, which can be used to prevent unauthorized access to the process control 112.

Figure 3:
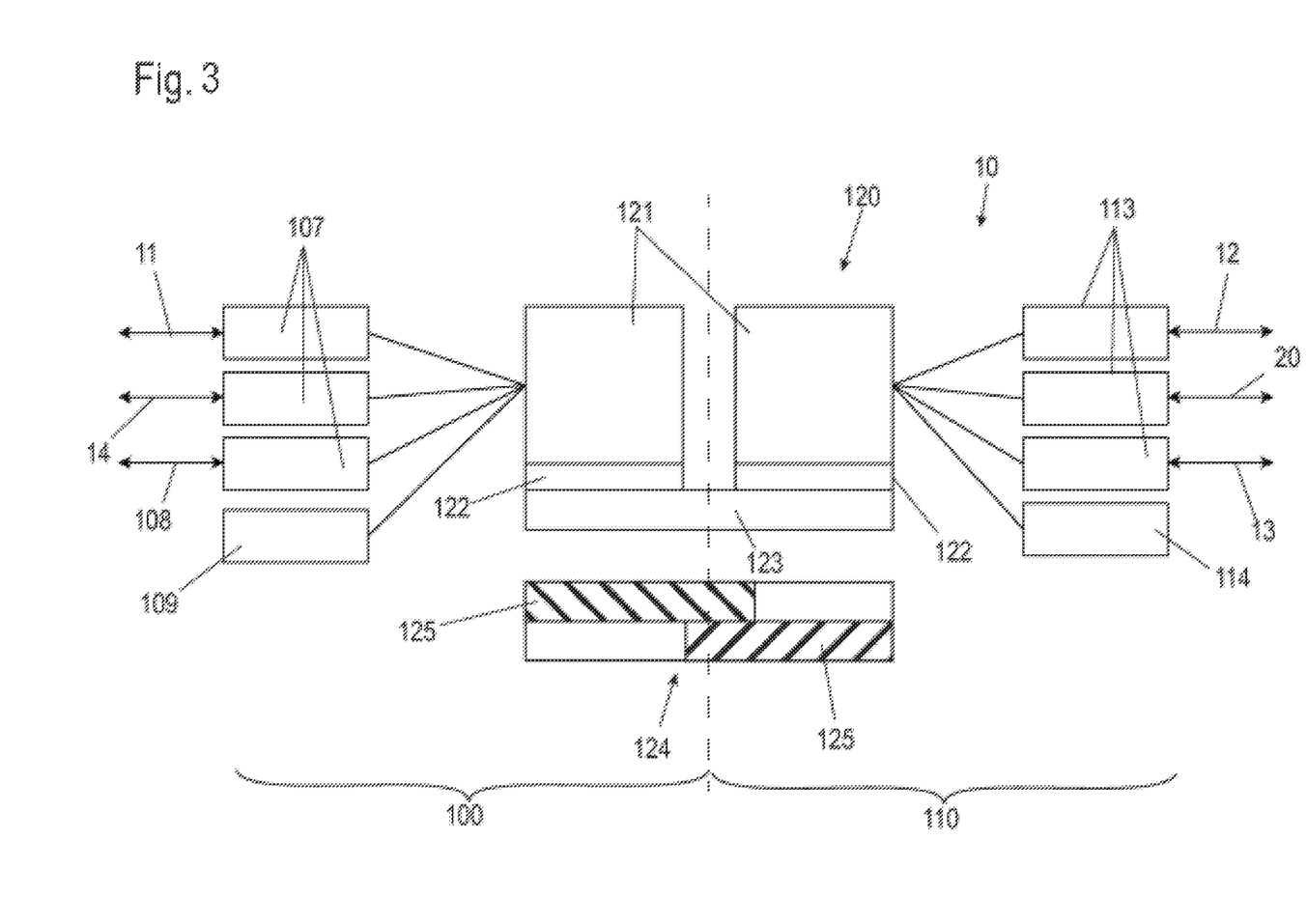
FIG. 3 is a schematic block diagram of the control system according to FIG. 1.

FIG. 3 shows the control system 10 with regard to its hardware structure in a schematic diagram. FIG. 3 serves in particular for illustrating the distribution of the hardware with respect to the non-real time system 100 and the real-time system 110.

The control system 10 shown as an example includes a processor 120 used jointly by the non-real time system 100 and the real-time system 110. It should be noted that an embodiment of the control system 10, wherein a separate processor exists for each of the non-real time system 100 and the real-time system 110, is possible. The embodiment shown, however, is more advantageous in terms of cost optimization, while still providing a secure separation between the non-real time system 100 and the real-time system 110.

In the embodiment shown, the processor 120 has two cores 121 which represent arithmetic units operating independently from each other. In alternative embodiments, the use of processors with more than two cores is also possible, wherein at least one of the cores is assigned to the non-real time system 100 and one of the cores is assigned to the real-time system 110.

Each core 121 has a separate first intermediate storage 122, also referred to as level 1 cache, that can only be used by this core 121, A second intermediate storage 123, also referred to as level 2 cache, can be used by both cores 121. Here again, alternative embodiments are possible, which use separate second intermediate storages.

The control system 10 further has a memory 124, which can also be used by both cores 121 and is thus available to both the non-real time system 100 and the real-time system 110. A storage management module, not shown, regulates the access by the processor 120 to the memory 124. In this context, it is contemplated to assign different memory areas 125 to the two cores 121, which partly overlap within the memory 124. In this way, a first part of the memory 124 is only available to the core 121 of the non-real time system 100, and a second part of the memory 124 is only available to the core 121 of the real-time system 110. A third part of the memory 124 can be used by both cores 121 and is thus available to both the non-real time system 100 and the real-time system 110. This third part of the memory 124 can be used to exchange data between the non-real time system 100 and the real-time system 110. A comparable distribution can also be contemplated for the second intermediate storage 123.

By separating the processor 120 and the memory 124 in separate cores 121 and/or parts of the memory 124, which are only assigned to the non-real time system 100 or the real-time system 110, respectively, a secure environment is created for the real-time system 110 to protect it from unauthorized access by the non-real time system 100. The production environment, which is controlled by the control system 10, is thus protected against unauthorized access, for example, from the Internet and malware spread through it.

Accordingly, a software update can be performed separately for the real-time system 110 and the non-real time system 100. The latter generally requires more frequent updates to be able to close security gaps that became known. In the real-time system 110, updates are rather avoided, in order to avoid having to interrupt a running system and to minimize a risk of unpredictable consequences of the update. The strict isolation of the real-time system 110 benefits this, as isolated systems have less frequently exploitable vulnerabilities.

The separation and safeguarding is also reflected in the connections to the control system 10. In particular, network connections for the non-real time system 100 and the real-time system 110 are separated from each other, where possible. Therefore, the control system 10 has interfaces 113 in the real-time system 110, for example, an Ethernet interface, which serves the field bus connection 12 which may be Ethernet based, a rear-panel interface, which serves the bus system 20 for the I/O modules 21, and another field bus interface 13, e. g. for a CAN (Controller Area Network) bus. In addition, a non-transitory storage 114, for example, a flash storage, can exist for the real-time system 110.

The non-real time system 100 also has interfaces 107, for example, an Ethernet interface for the network connection 11 for connection with an internal Ethernet. Another one of the interfaces 107 is, for example, a USB interface, which serves the USB connection 14. In addition, an interface for a card slot 108 can be provided, in which an SD card can be inserted, for example. Similar to the real-time system 110, a permanently built-in non-transitory storage 109 can be provided, for example, in the form of an eMMC card (embedded Multimedia Card).

The method according to the application for developing binary programs 111 for the actual process control 112 of the control system 10 via a web browser 41 operated in an (external) computer 40 has been described in conjunction with FIG. 2 for the combination of a control system 10 and a computer 40.

Figure 4:
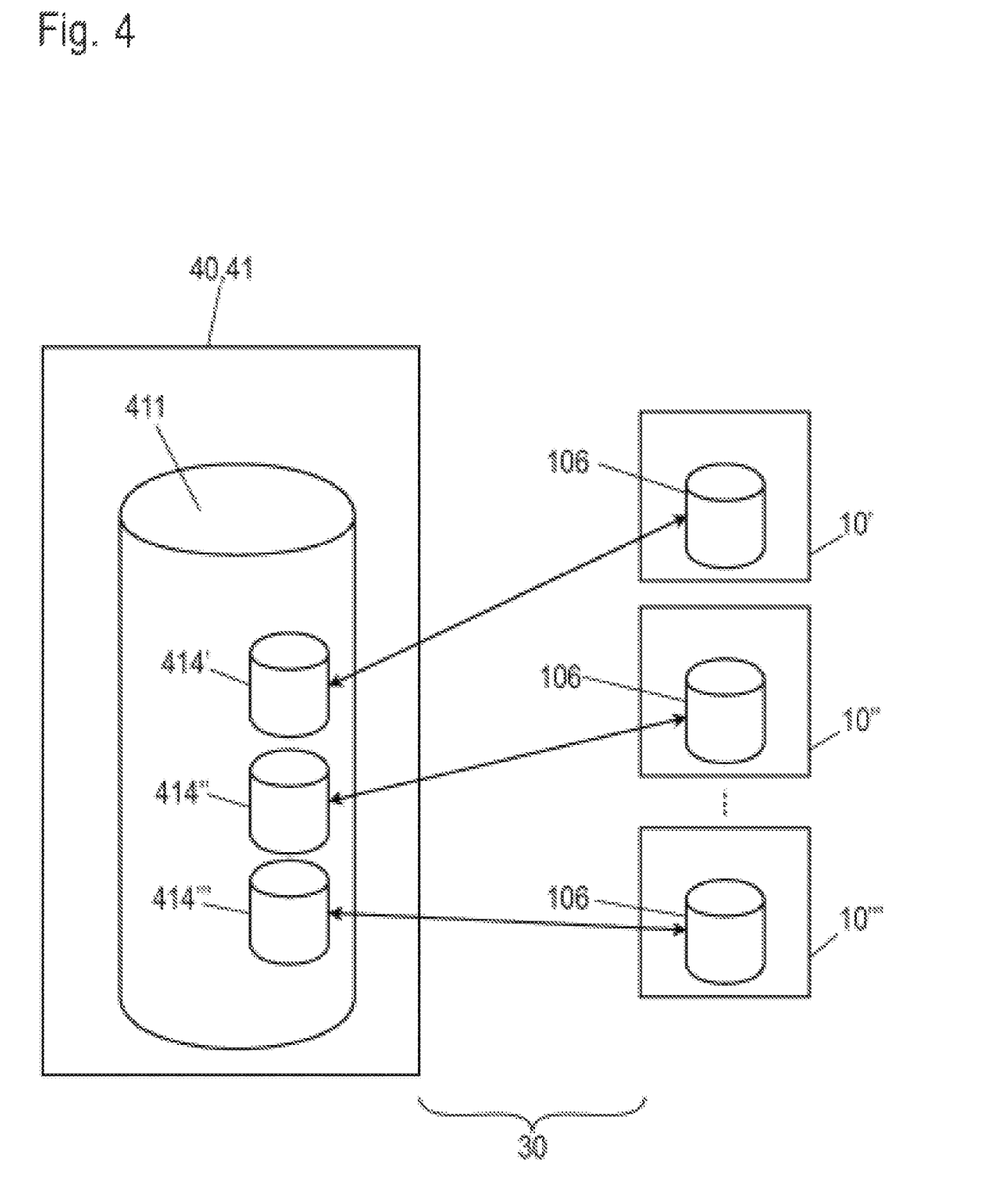
FIG. 4 is a schematic diagram of an assembly of several control systems and a computer coupled thereto for processing a distributed project.

According to FIG. 4, an assembly in which several control systems 10', 10" and 10'" exist in a so-called distributed project can be managed and programmed from a computer 40. The number of the three control systems shown here is merely an example. The number can also be two or be more than three.

By way of example, the structure of each of the mentioned control systems 10', 10" and 10'" is such as described in conjunction with the above figures. In particular, each of the control systems 10', 10" and 10'" has its own web server, which can be accessed via a network 30. In addition, a version storage 106 is provided in each of the control systems 10', 10" and 10'", in which one or more control programs are stored in both a binary version (see binary program 111 in FIG. 2) and in the form of source codes (see, e. g. function block diagram 411 according to FIG. 1), in different development states, if applicable.

For processing or developing the programs in the version storage 106 of the control systems 10', 10" and 10'", it is possible to access each of the control systems 10', 10" and 10'" from the computer 40 via a web browser 41, as described above, and to load the corresponding program for processing, develop it or change it, if applicable. In this way, several control systems 10 can be centrally maintained from one computer 40.

In an advantageous embodiment, it is contemplated to define a superordinate project from the computer 40, which is used to manage the control systems 10', 10", 10'" involved. Within the version management 411 of the superordinate project, a mirror image of the version storages 106 is created for each of the control systems 10', 10" and 10'" involved. These mirror images are shown in FIG. 4 within the version management 411 as version storage mirror images 414', 414" and 414'". Preferably, for this purpose a web server is operated in the computer 40 itself or on another computer (server), which, comparable to the web server 101 of the control systems 10', 10", 10'", provides the development environment used in the form of web sites.

The version storage mirror images 414', 414" and 414'" provide the advantage that, if applicable, it is also possible to work on programs for the control systems 10', 10", 10'" at the central computer 40, if the relevant control system 10', 10", 10'" is currently not available. When the control system 10', 10", 10'" is available again, for example, because the computer 40 is operated again in the same network as the corresponding control system 10', 10", 10'", preferably an alignment between the version storages 106 in the corresponding control system 10 and the version storage mirror image 414 in the version management 411 on the computer 40 is performed.

In this way, even if one of the control systems 10', 10" and 10'" is processed via a different computer, the sub-projects of the individual control systems 10', 10", 10'" remain consistent in the computer 40 that processes the superordinate project.

In this way, flexible working with distributed projects is possible. The sub-projects of the individual control systems 10', 10", 10'" can be directly accessed using the corresponding network address and the sub-projects can be processed and changed independently of the superordinate project. The project can then be processed across various control systems on the computer 40 that is superordinate in this sense.

Advantageously, projects can thus initially be started on a small scale using one control system 10', 10", 10'" and later applied to a larger context, for example, to a bigger facility, which is controlled by several control systems 10. The projects are scaled accordingly, depending on the size of the selected automation solution. Variants of an automation solution can be easily generated or managed, wherein the users do not need to concern themselves with the consistent integration of the sub-projects, as this is automatically performed by mirroring the version storages 106. The maintenance and support of a distributed project is thus simplified, as it is possible to implement specific adaptations to individual ones of the control systems 10, without having to process the overall project on a superordinate level.

The invention claimed is:

1. A method for programming and operating a control system of an industrial automation facility in which a program for the control system is developed with a development tool, comprising the steps of:
    (a) transmitting data from a web server built into the control system to a computer connected to the control system via a network, the data including a web-based development environment;
    (b) representing the development environment in a web browser residing on the computer;
    (c) at least one of developing and processing a program for the control system by a user;
    (d) converting the program into a high-level language program with a conversion module embodied in the web browser;
    (e) transmitting the high-level language program to the control system;
    (f) converting the high-level language program into a binary program within the control system; and
    (g) implementing the binary program by the control system.

2. The method according to claim 1, wherein the program is at least one of developed and edited in a graphic programming language.

3. The method according to claim 1, wherein said high-level language program comprises C source code.

4. The method according to claim 1, wherein the program is also transmitted to the control system by the computer.

5. The method according to claim 1, and further comprising storing at least one of the program, the high-level language program and the binary program in a version storage of the control system.

6. The method according to claim 5, wherein at least the program and the binary program are stored in an assigned version storage, respectively.

7. The method according to claim 6, wherein different development states of the program and the relevant binary program are stored in the assigned version storage, respectively.

8. The method according to claim 5, further comprising loading the program stored in the version storage into the development environment for processing by the computer.

9. The method according to claim 1, further comprising processing programs for at least two control systems in a web browser.

10. A control system for an industrial automation facility comprising a web server adapted to provide a computer connected to the control system via a network with a development environment for programs which can be implemented in a web browser on the computer, wherein the control system is programmed and operated using a method according to claim 1.

11. The control system according to claim 10, and further comprising a real-time system for implementing a binary program for performing control tasks and a non-real-time system for providing the web server.

12. The control system according to claim 11, wherein different cores of a processor are assigned to the real-time system and the non-real-time system, respectively.

13. The control system according to claim 12, wherein at least one of a first intermediate storage device and a second intermediate storage device is assigned exclusively to each core of the processor.

14. The control system according to claim 11, wherein a first part of a memory is exclusively assigned to the real-time system, a second part of the memory is exclusively assigned to the non-real time system, and a third part of the memory can access both the real-time system and the non-real-time system.

15. The control system according to claim 11, wherein different interfaces are assigned to the real-time system and the non-real-time system.

* * * * *